Oct. 2, 1928.
A. F. RODEKOHR
VEHICLE BED
Filed Aug. 25, 1927
1,686,294
2 Sheets-Sheet 2
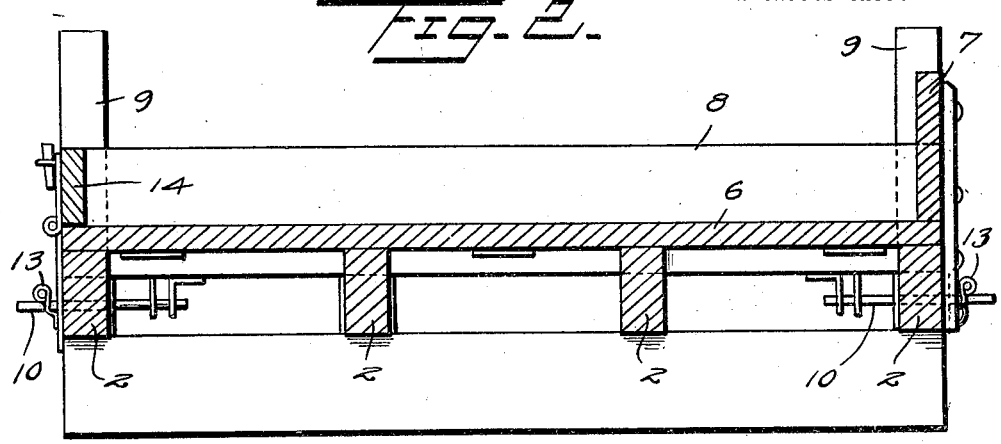
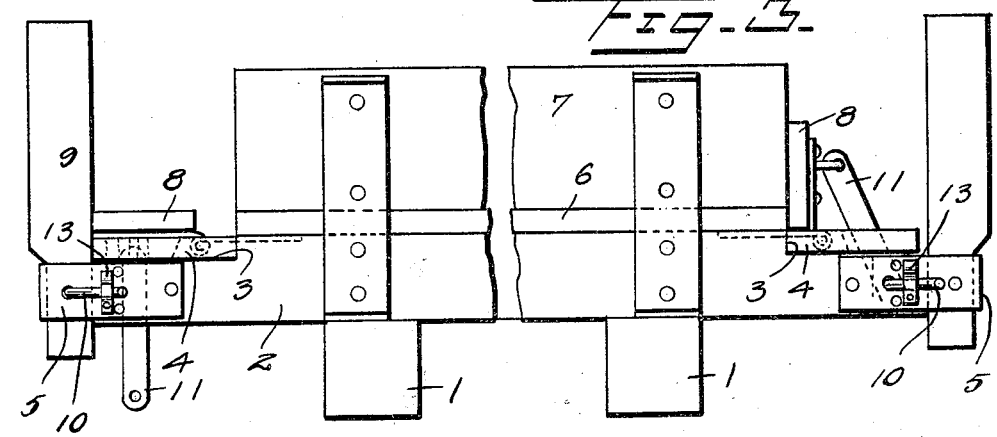
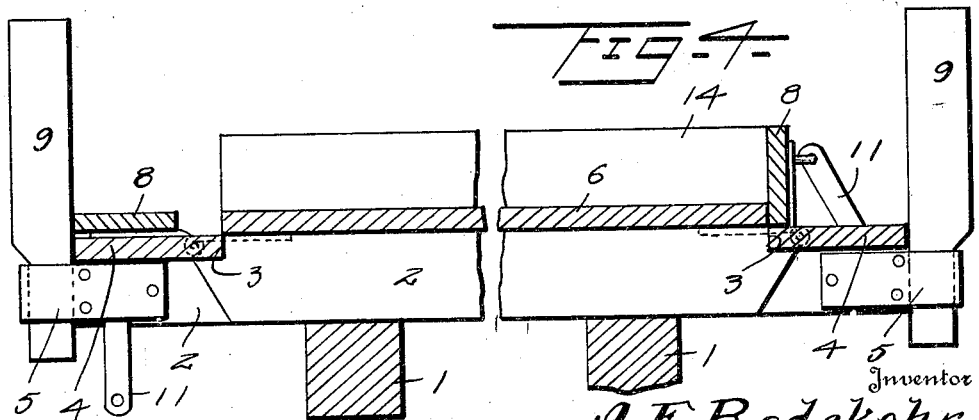
Inventor
A. F. Rodekohr
By Watson E. Coleman
Attorney Patented Oct. 2, 1928.

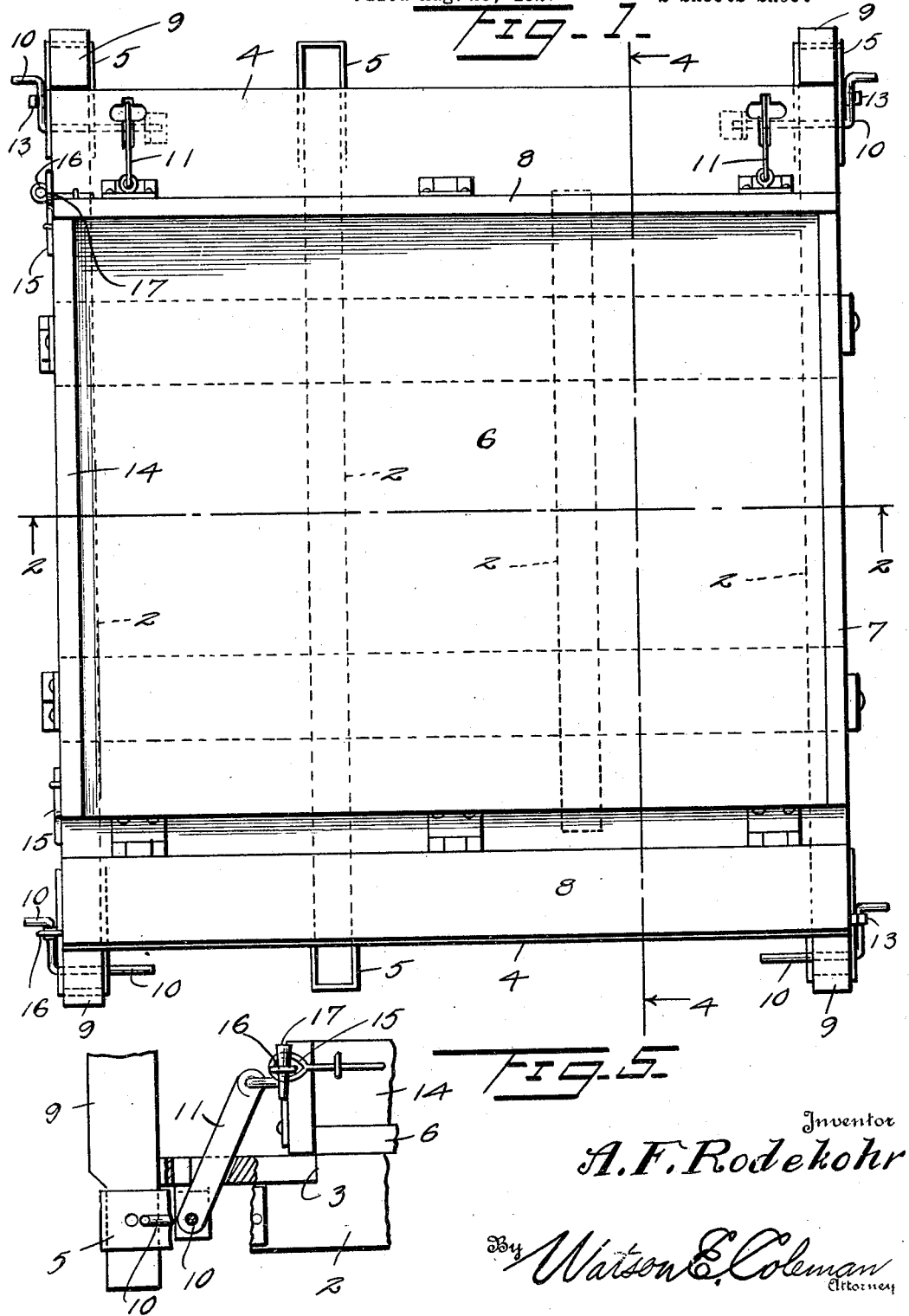

1,686,294

UNITED STATES PATENT OFFICE.

ARTHUR F. RODEKOHR, OF BATTLE CREEK, NEBRASKA.

VEHICLE BED.

Application filed August 25, 1927. Serial No. 215,481.

This invention relates to a vehicle bed especially adapted to be used as an automobile body attachment, and it consists in the novel features hereinafter described and claimed.

An object of the invention is to provide a bed or box having its parts and features so arranged and assembled that the structure may be readily converted from a truck box to a lumber platform or animal rack as desired or required. The structure is adapted to be placed upon the rear part of any automobile machine of the roadster type and is especially suitable for application to the frame of a Ford machine.

With this object in view the structure includes longitudinally disposed beams adapted to rest upon the frame of the automobile machine and having sills mounted upon their upper surfaces and disposed transversely thereof. The end portions of the sills extend beyond the outer sides of the beams and are provided with stake pockets. Flooring is applied to the upper edges of the sills and side panels are hingedly connected with the side edges of the flooring and may be swung from positions at right angles to the flooring to positions in horizontal alinement therewith. The side pieces are connected with the end portions of the sills and are disposed below the plane of the flooring. When the panels are swung down they rest firmly upon the upper surfaces of the side pieces and consequently they extend or enlarge the surface area of the floor of the structure. Prop supports are pivotally connected with the panels and pass through slots provided in the side pieces and may be engaged by pins detachably carried by the sills and whereby the panels may be held in vertical positions with relation to the flooring.

An end gate is hingedly connected with the rear sill and means are provided for connecting the free edge portion of the end gate with corresponding portions of the panels when the structure is used as a truck box. When the structure is used as a platform for carrying lumber, the panels are lowered and long pieces of timber may be carried upon the upper surfaces of the panels and the forward ends of the timber extended over the forward portion of the fender of the automobile machine and they may rest lightly thereon. When the device is used as a stock crate the side panels are lowered and rack panels are supported in the stake pockets so that there will be ample floor space to carry enough stock weight to make a load.

In the drawings,

Figure 1 is a top plan view of the bed,

Fig. 2 is a longitudinal sectional view thereof cut on the line 2—2 of Fig. 1,

Fig. 3 is an end elevational view of the bed,

Fig. 4 is a sectional view thereof, cut on the line 4—4 of Fig. 1, and

Fig. 5 is a fragmentary elevational view of a corner portion of the bed with parts thereof broken away and parts shown in section.

As illustrated in the accompanying drawing, the vehicle bed comprises spaced beams 1 adapted to be placed upon the frame of an automobile machine in any suitable manner. Sills 2 are disposed transversely across the beams 1 above the upper surfaces thereof and the upper edge portions of the sills at their ends are cut away forming recesses 3. Side pieces 4 are fitted in the recesses 3 with their upper surfaces flush or level with the upper edge surfaces of the sills. Stake pockets 5 are carried at the ends of the sills. Flooring 6 is applied to the elevated intermediate portions of the sills and a head board 7 is mounted at the forward edge of the flooring 6. Side panels 8 are hingedly connected with the side edges of the flooring and may be swung from vertical positions against the edges of the flooring to horizontal positions whereby the said panels lie flat upon the upper surfaces of the side pieces 4. The head board 7 does not extend transversely across the side pieces or the side panels when the said panels are lowered and consequently pieces of lumber or timber may be placed upon the upper surfaces of the side panels when lowered and the forward portions of the said pieces of timber may extend forwardly along the sides of the automobile machine and rest lightly upon the upper ends of the front fenders. Thus long pieces of material may be readily carried by the bed even though the same is applied to a relatively small machine.

Stakes 9 are inserted in the pockets 5, and hold the pieces of timber in position upon the bed. Crank pins 10 pass transversely through the end portions of the sills 2 and may pass through the lower ends of prop supports 11 which are pivoted at their upper ends to the sides of the panels 8. The lower portions of the props 11 pass through slots 10 provided in the pieces 4. Spring clips 13 are mounted at the outer surfaces of the terminal sills 2 and may receive the crank ends of the pins 10 whereby said pins are held against longitudinal movement in the sills whereby the pins are held in proper engagement with the members 11. Thus means are provided for holding the side panels in vertical positions at the edges of the flooring. When it is desired to lower the panels, the pins 10 are turned so that their crank portions disengage the clips 13 and then the pins are withdrawn from the props and the sills, thus permitting the side panels to be swung down upon the side pieces 4 as hereinbefore described. After the pins 10 have been withdrawn from the sills they may be inserted through the outer portions of the stake pockets and the lower ends of the stakes and their crank ends may be swung over into the clips 13 whereby the stakes will be securely held in the pockets.

An end gate 14 is hingedly connected at the rear edge of the flooring and is adapted to swing to a vertical position above the upper surface of the flooring. The end gate is provided with loop members 15 at its ends adapted to engage over similar loop members 16 carried at the rear ends of the side panels 8 and when the said side panels are in vertical positions. Pins 17 may be passed through the loops of the members 16 whereby the end portions of the end gate are connected with the side panels and the end gate is held in a vertical position by the side panels. When the end gate is vertically disposed the bed may be used as a truck body for carrying loose or unpacked articles or commodities. When used as a stock rack the side panels 8 are lowered and slatted rack panels are inserted in the stake pockets and thus the structure is converted into a bed for carrying live stock. When the side panels 8 are swung down their upper side surfaces lie in the same plane as the upper surface of the flooring and thus the floor space is increased or extended so that a sufficient weight of the live stock may be loaded into the bed to make it a complete load.

Attention is particularly called to one advantage which this box has over other boxes of the same size and type, which is that the side pieces 4, being located directly above the rear wheel of the car, constitute in effect a fender and from this fender a mudguard of heavy tin may extend downward to the running board of the car. This is of advantage as, for instance, in buying a new car where the rear fenders may be omitted and thus the price of these rear fenders saved. The mudguard is not shown inasmuch as it is believed to be obvious that with the construction shown in the drawings the member 4 does constitute a fender and that a mudguard might be used.

Having thus described my invention, what is claimed, is:

1. A vehicle bed comprising spaced sills having recesses at their upper edges and at their ends, side pieces fitting in the recesses with their upper surfaces alined with the upper edges of the intermediate portions of the sills, flooring mounted upon the intermediate portions of the sills, and side panels hinged at the edges of the flooring and adapted to swing over the side pieces and lie with their upper surfaces in the same plane as that occupied by the upper surface of the flooring.

2. A vehicle bed comprising sills provided with recesses, side pieces fitting in the recesses and having upper surfaces alined with the portions of the upper edges of the sills, flooring mounted upon the upper edges of the sills, side panels hinged at the edges of the flooring and adapted to swing over the side pieces, and lie with their upper surfaces alined with the upper surface of the flooring.

3. A vehicle bed comprising sills provided with recesses, flooring mounted upon the upper edges of the sills, side pieces fitted in the recesses and lying in a plane below the plane of the flooring, panels hinged at the edges of the flooring and adapted to swing over the side pieces with their upper surfaces lying in a plane alined with the upper surface of the flooring.

4. A vehicle bed comprising sills provided with recesses, side pieces fitting in the recesses, flooring mounted upon the sills and disposed in a plane above the side pieces, side panels hinged at the edges of the flooring and swingable from positions where they are vertically disposed to positions where they are horizontally disposed and overlie the side pieces, prop members pivotally connected with the side panels, and pins passing through the sills and engaging the prop members.

In testimony whereof I hereunto affix my signature.

ARTHUR F. RODEKOHR.